(12) United States Patent
Eberhard

(10) Patent No.: US 11,168,808 B2
(45) Date of Patent: Nov. 9, 2021

(54) VALVE DEVICE FOR CONTROLLING MEDIA FLOWS OF ANY TYPE

(71) Applicant: RSG ELECTRONIC GMBH, Ingelfingen (DE)

(72) Inventor: Ralph Eberhard, Oehringen (DE)

(73) Assignee: RSG ELECTRONIC GMBH, Ingelfingen (DE)

( * ) Notice: Subject to any disclaimer, the term of this patent is extended or adjusted under 35 U.S.C. 154(b) by 69 days.

(21) Appl. No.: 15/314,528

(22) PCT Filed: Jun. 5, 2015

(86) PCT No.: PCT/EP2015/001141
§ 371 (c)(1),
(2) Date: Nov. 29, 2016

(87) PCT Pub. No.: WO2015/188924
PCT Pub. Date: Dec. 17, 2015

(65) Prior Publication Data
US 2017/0152964 A1   Jun. 1, 2017

(30) Foreign Application Priority Data

Jun. 13, 2014   (DE) .................... 10 2014 008 651.8

(51) Int. Cl.
*F16K 31/122*    (2006.01)
*F16K 3/26*    (2006.01)
(52) U.S. Cl.
CPC .......... *F16K 31/1221* (2013.01); *F16K 3/267* (2013.01)

(58) Field of Classification Search
CPC .... F16K 31/1221; F16K 39/022; F16K 3/265; F16K 3/267; F16K 3/262; F16K 1/34; F16K 1/46; F16K 27/02
(Continued)

(56) References Cited

U.S. PATENT DOCUMENTS 2,899,168 A * 8/1959 Kleczek ................. G05D 16/10
251/63.5
3,572,382 A * 3/1971 Luthe .................... F16K 39/022
137/625.35
(Continued)

FOREIGN PATENT DOCUMENTS

CH         581 798      11/1976
DE        24 19613      11/1975
(Continued)

OTHER PUBLICATIONS

International Search Report (ISR) dated Aug. 13, 2015 in International (PCT) Application No. PCT/EP2015/001141.

*Primary Examiner* — Craig M Schneider
*Assistant Examiner* — Andrew J Rost
(74) *Attorney, Agent, or Firm* — Wenderoth, Lind & Ponack, L.L.P.

(57) ABSTRACT

A valve device (1) controls media flows of any type by a valve control piston (33) guided in a longitudinally movable manner in a valve housing (3) and controlling a media connection between media connection points (9, 11) in the valve housing (3). One media connection point is a pressure supply inlet (P). Another media connection point is a load outlet (A). The valve control piston (33) is guided in the valve housing (3) with pressure equalization by an equalizing apparatus (35) with respect to the media pressure at the pressure supply inlet (P).

16 Claims, 3 Drawing Sheets

(58) Field of Classification Search
USPC .............. 251/62, 63.5, 282, 324, 325, 63.6
See application file for complete search history.

(56) References Cited

U.S. PATENT DOCUMENTS

| | | | | | |
|---|---|---|---|---|---|
| 3,771,562 | A | * | 11/1973 | Curran | F16K 3/267 137/625.38 |
| 3,794,063 | A | * | 2/1974 | Carroll | F16K 3/26 137/505.26 |
| 4,011,892 | A | * | 3/1977 | Kowalski | E21B 34/04 137/625.27 |
| 4,167,262 | A | * | 9/1979 | Lemmon | F16K 31/363 137/487.5 |
| 4,646,579 | A | * | 3/1987 | Klein | F16J 15/525 74/18.1 |
| 5,236,014 | A | * | 8/1993 | Buis | F16K 39/04 137/625.3 |
| 5,771,931 | A | * | 6/1998 | Watson | E21B 33/0355 137/236.1 |
| 5,772,182 | A | * | 6/1998 | Stambaugh, Sr. | F02C 7/232 137/557 |
| 5,778,918 | A | * | 7/1998 | McLelland | E21B 33/0355 137/15.02 |
| 5,899,653 | A | * | 5/1999 | Brodine | H01L 21/67748 414/222.04 |
| 6,394,135 | B2 | * | 5/2002 | Erickson | F16K 39/04 137/625.38 |
| 7,832,426 | B2 | * | 11/2010 | Wears | F16K 11/044 137/625.38 |
| 8,573,245 | B1 | | 11/2013 | Jansen | |
| 2008/0290313 | A1 | | 11/2008 | Larsen | |

FOREIGN PATENT DOCUMENTS

| | | |
|---|---|---|
| DE | 197 46 041 | 4/1998 |
| DE | 199 50 974 | 4/2001 |
| DE | 101 39 197 | 3/2003 |
| DE | 103 07 963 | 9/2004 |
| DE | 199 01 253 | 2/2006 |
| DE | 103 49 057 | 2/2008 |
| JP | 57-129980 | 8/1982 |

* cited by examiner

VALVE DEVICE FOR CONTROLLING MEDIA FLOWS OF ANY TYPE

FIELD OF THE INVENTION

The invention relates to a valve device for controlling media flows of any type by at least one valve control piston that is movably guided longitudinally in a valve housing and that controls a media connection between at least two media connection points in the valve housing. At least one media connection point is a pressure supply inlet. At least one other media connection point is a load outlet.

BACKGROUND OF THE INVENTION

DE 199 01 253 B4 discloses a coaxial valve type device with a housing body, which is arranged between two media connection points in the form of an inlet and an outlet nozzle. The housing body is an extruded section. In each case, a seal is arranged between the inlet nozzle and the extruded section, as well as between the outlet nozzle and the extruded section. In a further development of this solution, DE 103 49 057 B4 discloses a head tube for such a coaxial valve, with a valve closure member arranged on the head tube. The head tube itself has a tubular section, on a first side of which a valve closure member is arranged. Because the cross-sectional area of the inlet opening facing away from the valve closure member serving as the media connection point of the head tube is smaller than the cross-sectional area of the region between the inlet opening and the valve closure member in the prior art solution, wherein a baffle is glued into the head tube in order to reduce the cross-sectional area of the inlet opening, with the prior art device no unwanted flow noises are generated during the operation of the same. In spite of this advantage of reduced noise during the operation of the valve device, the valve device still leaves something to be desired, particularly with respect to functional reliability when obstruction- and fault-free operation is required. Also, rapid switching between connecting and then disconnecting the media-carrying connection between the connection points is not readily achievable with the prior art solution, owing to the cross section reduction by the baffle glued into the head tube.

SUMMARY OF THE INVENTION

On the basis of this prior art, the problem addressed by the invention is to design a valve device that is improved with respect to the prior art, reliable in operation, and switches in rapid succession with the valve control piston.

According to the invention, in the valve device, the valve control piston thereof is guided in the valve housing by at least one equalizing mechanism with pressure equalization, at least with respect to the media pressure at the respective pressure supply inlet.

The inventive solution has, among other things, the advantage that the fluid pressure prevailing at the pressure supply inlet in each case cannot exert any deflection force on the valve control piston, particularly not in a way that would cause the valve piston to be lifted from the valve seat or to be seated thereon with impermissibly high pressure. That high pressure is undesirable and could damage the gasket in this area. In contrast to comparable valves of the prior art, only low actuation forces are needed to keep the valve control piston on the valve seat and/or to lift it therefrom. Hence the associated actuation mechanisms for controlling the valve control piston can be smaller. According to the invention, the valve control piston is guided in the valve housing with pressure equalization in each of its movement positions, enabling the achievement of very rapid switching for establishing a connection with medium or fluid flow between the connection points and then separating these connection points. Because obstruction-free and fault-free operation is ensured on all accounts during the movement of the valve control piston, the pressure equalizing method also ensures greater functional reliability. Furthermore, the valve device of the invention is inexpensive to manufacture.

To form a seal in a particularly advantageous manner, the pressure equalizing mechanism has a first seal that causes the valve control piston to assume the same diameter on its media control side as another, and has second seal of the pressure equalizing mechanism that engages on the valve control piston, namely on the actuation side thereof. Not only is a secure sealing of the valve control piston, especially in its closed position, achieved via the respective seals, but also a secure longitudinal guiding for the valve control piston as it moves into one of its open positions is also ensured, at least via one seal.

Viewed in its closed position, the valve control piston advantageously has a uniform diameter, at least between the two seals. Such valve control piston is particularly easily manufactured because its contour on the peripheral side does not have to be provided with additional ledges or bevels. In this manner, no unwanted contact surfaces for the fluid pressure in either the axial or the radial direction of the valve control piston are present. Owing to the uniform outer diameter of the valve control piston in the vicinity of the media connection points, the pressurized fluid or pressurized medium acting on the valve control piston in its open position in each case can be guided around the outer peripheral surface of the valve control piston in a uniform and force-free manner. There is no equivalent to this force-free operation in the prior art. For controlling the preferably pneumatically operating actuation mechanism, use can be made of commercially available pilot valves, including ones corresponding to a standard of the Standardization Association for Measurement and Control in Chemical Industries (NAMUR), for example.

In a particularly advantageous manner, the valve control piston is designed as a hollow piston. The cavity of the valve control piston coaxially leads into the load outlet. Further preference is given to the hollow piston being equipped, in the direction of its actuation side, with at least one passage point, preferably configured as a damping bore that connects, with permanent media flow, the cavity of the hollow piston to an equalizing chamber of the valve housing, into which the valve control piston is retractably guided in the valve housing. Because the cavity of the hollow piston is also cylinder-shaped on its inner peripheral side, the fluid guided between the media connection points in each case contacts the hollow piston in a uniform manner and supports the desired operation with pressure equalization during the movement of the valve control piston. A hydraulically damped closure is achieved for the valve control piston via the damping bore provided for this purpose, effectively preventing hydraulic pressure surges during the operation of the valve device.

Further provision can be made of a pressure relief mechanism in the valve housing between the equalizing chamber and the environment of the valve. Any leakage volumes can also be drained from the valve housing via the pressure relief mechanism provided for this purpose.

The valve housing is preferably of a cartridge configuration and can be detachably inserted in a valve block. The media connection points of the valve block can be interconnected with fluid flow in the inserted position. Valves configured in this manner are particularly easy to replace and are therefore versatile. Furthermore, components of the valve device as well as the valve device itself can be quickly replaced with new parts or new valve devices in the event of malfunctions or repairs.

Furthermore, a ring magnet that interacts with a magnetic field sensor can be arranged on the valve control piston. A limit switch is then formed. With the limit switch, the respective position of the valve control piston can be analyzed in a computer or the like for control processes.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
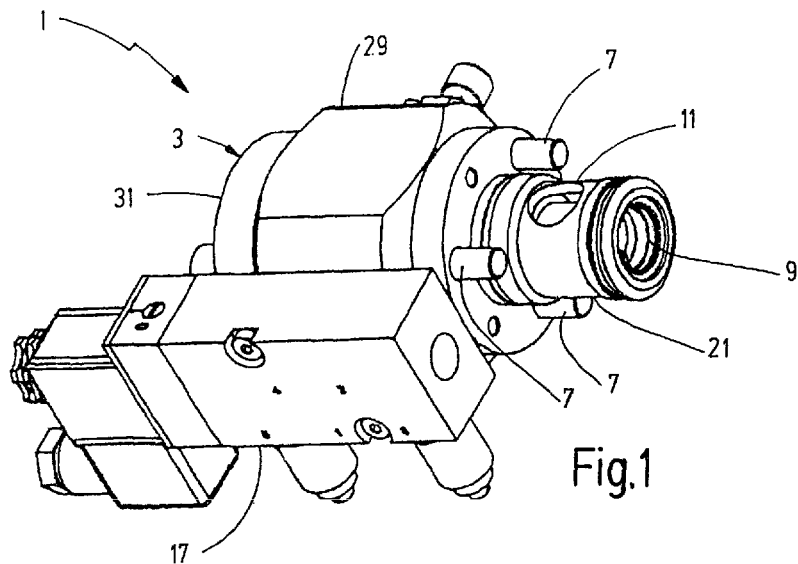
FIGS. 1 and 2 are perspective and top views, respectively, of a valve device according to an exemplary embodiment of the invention.
Figure 2:
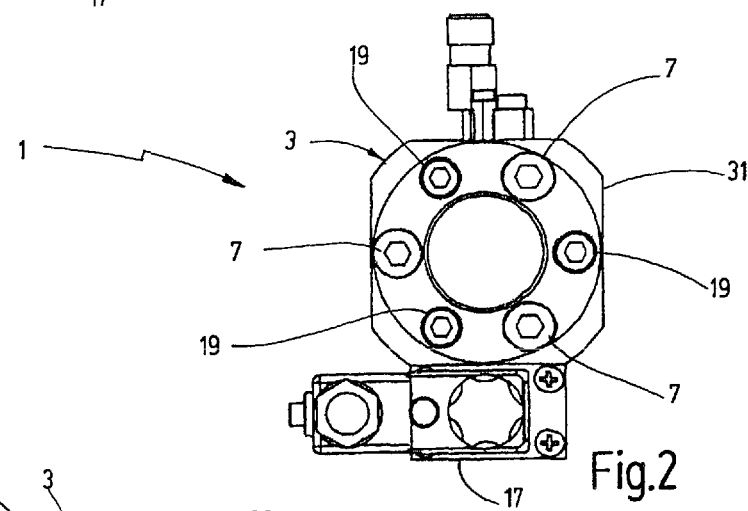
Figure 3:
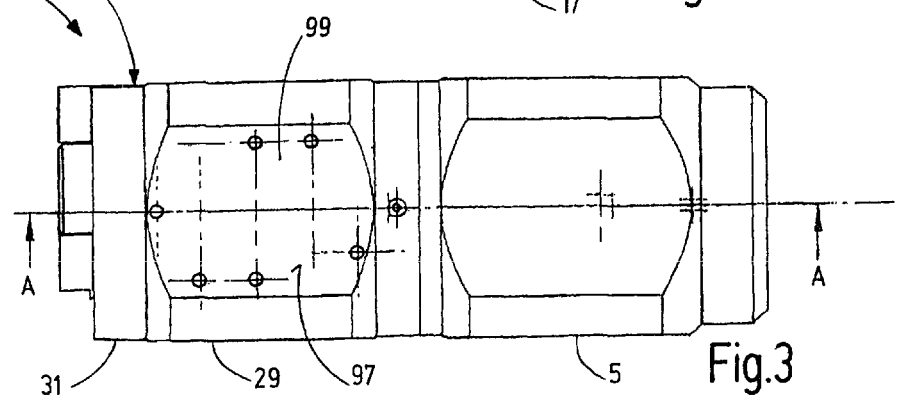
FIG. 3 is a side view of the valve device according to FIG. 1.

A valve device 1 according to an exemplary embodiment of the invention for controlling media flows of any type is shown in FIGS. 1 through 5. The valve device 1 is of cartridge design and has a valve housing 3, in particular of multiple-part design, that can be attached to a valve block 5 with three fasteners 7 in the form of, e.g., screws. The valve housing 3 has an axial media connection point 9 and two radial bores extending perpendicular thereto serving as a common radial media connection point 11. In the context of the invention, either of the media connection points 9 or 11 can be the pressure supply inlet P, with the respective other media connection point 9 or 11 being then a load outlet A. In the case shown, the connection point 11 is the pressure supply inlet P and the connection point 9 corresponds to the load outlet A. In the inserted position of the valve housing 3 in the valve block 5, the media connection points 9, 11 of the valve housing 3 are connected, with fluid flow, to correspondingly arranged media connection points 15 or 13, respectively, of the valve block 5.

Arranged laterally on the valve housing 3 is a pilot valve in the form of a 5/2-way NAMUR valve of rectangular design. Further provision is made of other fasteners 19, particularly in the form of screws, for joining the various parts 21, 23, 25, 27, 29 and 31 of the valve housing 3. The valve housing 3 has a bottom valve housing part 21, a retaining part 23, a control chamber housing 25, a middle part 27, a top valve housing part 29, and a cover part 31. The other or second fasteners 19 for the at least partial joining of the parts 21, 23, 25, 27, 29 and 31 of the valve housing 3 and the first fasteners 7 for securing the valve housing 3 in the valve block 5 are arranged alternatingly offset relative to each other on a circular arc, as can be discerned in particular in the view from above according to FIG. 2. The other fasteners 19 and the first fasteners 7 furthermore differ from each other in terms of their length and their diameter to avoid confusion of the fasteners when securing them.

Figure 4:
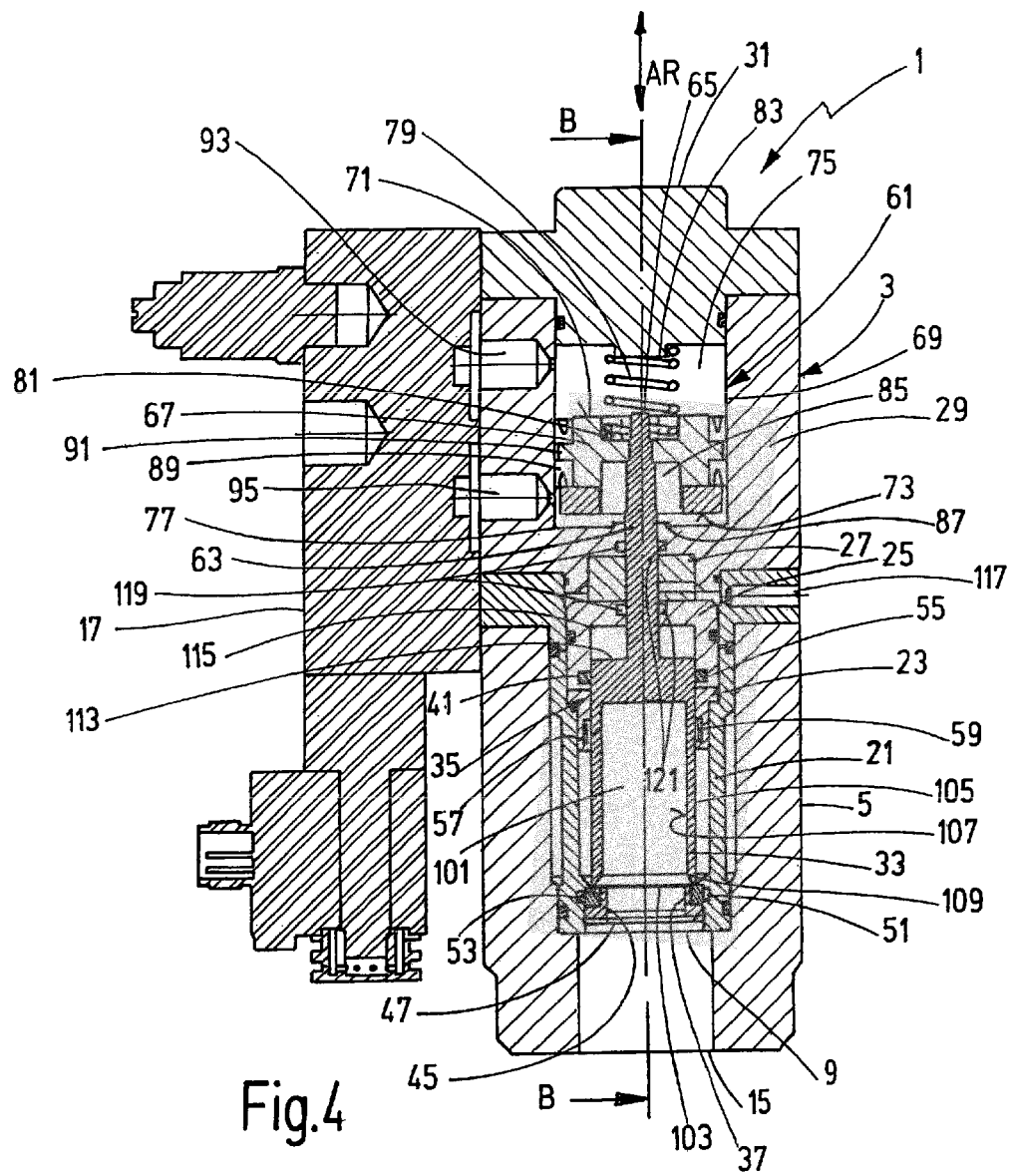
FIG. 4 is a bottom view in section of the valve device taken along the line A-A in FIG. 3.
Figure 5:
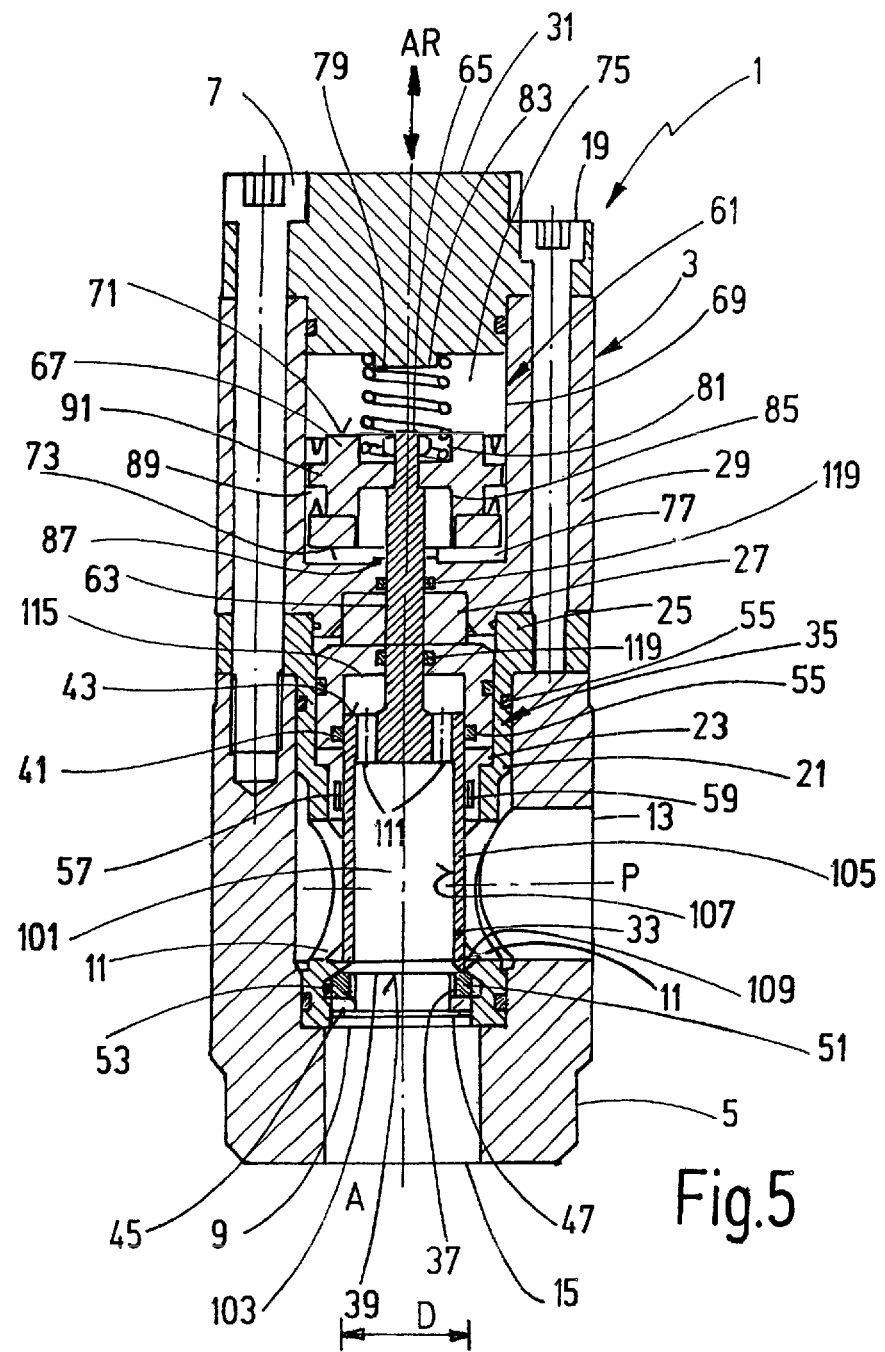
FIG. 5 is a cross view in section of the valve device taken along the line B-B in FIG. 4.

As FIGS. 4 and 5 show further, provision is made of a valve control piston 33 is guided in a longitudinally movable manner in parts of the valve housing 3 and controls a media connection between the two media connection points 9, 11 in the valve housing 3. One media connection point in this case is established as a pressure supply inlet P. The other media connection point is established as a load outlet A, as has already been explained.

According to the invention, the valve control piston 33 is guided in the valve housing 3 with pressure equalization by at least one pressure equalizing mechanism (designated in its entirely by 35) in each movement position, at least with respect to the media pressure at the respective pressure supply inlet P. To form a seal, the equalizing mechanism 35 has, among other things, a first seal 37 that causes the valve control piston 33 to assume the same diameter D on its media control side 39 as another, second seal 41 of the equalizing mechanism 35 that engages on the valve control piston 33 on the actuation side thereof. With respect to its outer circumference, the valve control piston 33 thus has a uniform diameter D that, at least in its closed position shown in FIGS. 4 and 5, extends over a specifiable axial length between the two seals 37, 41, preferably protruding above them when viewed from the bottom up.

The first seal 37 is an annular soft seal arranged in the vicinity of the load outlet A, against which the valve control piston 33 comes into facial abutment as it assumes its closed position. The soft first seal 37 is held by a retaining ring 45 with an L-shaped cross section, which is in turn secured in its installation position in the valve housing 3 by a locking ring 47. By securing the soft first seal 37 with a retaining ring 45 and a locking ring 47, the soft first seal 37 can be replaced very quickly with a new seal when needed, particularly in the event of wear. On its outer circumference, the soft first seal 37 is further sealed by an O-ring seal 51, which is received in a groove 53 of the valve housing 3. The second seal 41 is also configured as an O-ring that completely surrounds the valve control piston 33 on its back actuation side 43 and that is arranged in a recess 55 of the control chamber housing 25. Control chamber 25 is pot-shaped in cross section and is held in its position in the valve housing 3 as a part thereof by the other or second retaining part 23 with an L-shaped cross section.

The retaining part 23 has another, third annular sealing element 57, which is arranged in an inner circumferential groove 59 of the retaining part 23. The retaining part 23 provided for this purpose with the sealing element 57 likewise supports the valve control piston 33 and, as another part of the equalizing mechanism, also keeps the valve control piston 33 free of stress. In its closed position shown in FIGS. 4 and 5, hence between the two seals 37, 41 and extending above the second seal 41 by a specifiable protrusion to the rear, the valve control piston 33 has a uniform outer diameter D. In this manner, the valve control piston 33 is pressure equalized with respect to the lateral media connection 11 on all accounts so that a pressure differential arising between the connections 9 and 11 during operation and exerting an axial and/or radial force on the valve control piston 33 cannot exert a position-shifting effect on the valve control piston 33. Hence an obstruction-free operation with force equilibrium is achieved for the valve control piston 33 in each of its possible movement positions.

On its rear activation or actuation side 43, the valve control piston 33 can be controlled by an actuation mechanism 61 that is pneumatically operated, preferably via the pilot valve 17. For this purpose, the valve control piston 33 has, on its actuation side 43, an integrally connected valve stem 63. The free end 65 of valve stem 63 forms an actuating piston 67. The actuating piston 67 is received in a cavity 69 of the top valve housing part 29 such that it can be moved axially on the inner side of the top valve housing part 29. Two pressure chambers 75 and 77, with different pressure levels during operation, are formed on axially opposite sides 71, 73 of the actuating piston 67. The actuating piston 67 and the valve control piston 33 are then pneumatically displaceable in both axial directions AR.

An energy storage unit 79, in the form of a compressed spring 79, projects into a recess 81 of the actuating piston 67, on the top side thereof, and subjects the actuating piston to a force in a direction such that the actuating piston 67 is pressed on the valve stem 63, against a ledge of the valve stem 63. In the exemplary embodiment shown here, the energy storage unit 79 abuts on the cover part 31, where it is guided by a projection 83 engaging in the other free end of the spring. In its normal position, in which no pneumatic actuation forces need to act on it via the pilot valve 17, the valve control piston 33 is held by the spring tension of the energy storage unit 79 in the closed position. This normal position is also known by the technical term "normally closed." However, in an embodiment of the inventive valve solution, not illustrated here, the energy storage unit 79 can engage on the opposite side of the actuating piston 67. In this case the valve device 1 would then assume its, not illustrated, spring-tensioned open position as the normal position and the pilot valve 17 would then have to carry out the closing process pneumatically by the actuation mechanism 61.

The valve stem 63 passes through a recess 85 in the actuating piston 67 and is additionally guided via an inwardly projecting projection 87 arranged in the top valve housing part 29. The actuating piston 67 is in turn sealed by a circumferential seal 89 with respect to the top valve housing part 29 in both of its opposite movement directions AR. The actuating piston 67 has an annular projection 91 in its center for securing the circumferential seal 89 at the edges thereof.

The two pressure chambers 75, 77 in the top valve housing part 29 are connected, with media flow, to the pilot valve 17 via pressure connection points 93, 95 that lead to an outside 97 (FIG. 3) of the top valve housing part 29. On this outside 97 of the top valve housing part 29, provision is made of a standardized connection point array 99 for the NAMUR pilot valve 17, particularly in the form of a 5/2-way valve. The arrangement is chosen such that the NAMUR valve 17 can also be fastened rotated 180° on the top valve housing part 29, which allows the actuation direction of the valve device 1 to be reversed in a particularly expedient manner should the need arise, provided that the energy storage unit 79 is not in its second possible installation position (which is not shown in any greater detail, but which has been described).

The valve control piston 33 has the overall design of a hollow piston, the cavity 101 of which opens coaxially into the load outlet A. On the free end 103 of the valve control piston 33, the wall 105 of the valve control piston 33 and turned away from the cavity side 107 has a sealing edge 109 of triangular cross section, which enlarges the inner diameter of the hollow piston 33 in this zone while the outer diameter D thereof remains the same. The free end of the valve control piston 33, in the closed position of the control piston 33, comes in abutment linearly on the soft seal 37. This sealing is therefore achieved on an outer perimeter corresponding to the outer diameter D of the valve control piston 33.

In the direction of its actuation side 43, the control piston 33 is equipped with at least two passage points 111 (FIG. 5), configured as damping bores as a component of the equalizing mechanism 35. These damping bores 111 are provided in a floor 113 of the valve control piston 33, which floor 113 forms the one-piece transition between the hollow piston 33 and the valve stem 63. In this manner the cavity 101 of the hollow piston 33 is connected, with permanent media flow or fluid communication, to an equalization chamber 115 of the valve housing 3. Into chamber 115, the valve control piston 33 is retractably guided in the valve housing 3 from its closed position into one of its open positions. During this process, the passage points 111 effect a slow pressure equalization in the sense of a damping for the movement of the valve control piston 33, with respect to the fluid pressure at the axial media connection point 9, in the closed valve direction. Depending on the design of the valve device 1, the through-bores 111 can have different diameters, wherein the smaller the diameter, the greater the throttling of the media flow via the floor 113. In particular, a hydraulically damped closure for the valve device 1 can be achieved in this manner.

A pressure relief or leakage line 117 is in the valve housing 3 and passes through the valve housing 3. The line 117 passes through the bottom valve housing part 21 and the middle part 27 and borders the valve stem 63 of the valve control piston 33 between two opposite O-ring seals 119. Seals 119 are arranged in allocable recesses 121 of the top valve housing part 29 and of the control chamber housing 25. These O-ring seals 119 are held in position in their respective recesses 121 by the middle part 27. Any leakage during the operation of the valve that is not stopped by these seals can drain out of the valve housing 3 via the line 117.

The valve device 1 of the invention has the advantage that changes in the fluid pressure at the pressure supply inlet P or at the service or load connection A in each movement position of the valve control piston 33 cannot exert any effective transverse forces on the valve control piston 33. Those forces can otherwise cause an unwanted lifting of the piston from the valve seat 37 or cause it to be seated thereon with excessive closing forces during the closing process. Consequently, in order to keep the valve control piston 3 on the valve seat 37 or to lift the same from the valve control seat 37, lower forces can be applied than with comparable valves of the prior art. In this manner, the actuation mechanism 61 only needs to exert low actuating forces on the valve control piston 33. In the direction of the actuation side 43, the valve control piston 33 is furthermore equipped with passage points 111 serving as damping bores so that the valve control piston 33 can also be brought, with pressure equalization and in a damping manner with respect to the coaxial media connection 9, into its movement position that separates the connection points 9 and 11 from each other. Rather than providing a plurality of drive pistons connected in series, as is sometimes usual in prior art valves, only one actuating piston 67 needs to be provided for actuating the valve control piston 33.

For a similar installation size, the compact design of the valve device 1 on all accounts allows at least the next largest nominal size in each case. Because as many as six different design variants can be covered in this manner with just one construction, the valve device 1 can achieve a wide diversity of variants in the sense of a modular construction system.

While one embodiment has been chosen to illustrate the invention, it will be understood by those skilled in the art that various changes and modifications can be made therein without departing from the scope of the invention as defined in the claims.

The invention claimed is:

1. A valve device for controlling media flows, the valve device comprising:
    a valve housing having a pressure supply inlet and a load outlet;
    a valve control piston guided in and longitudinally movable in said valve housing along a longitudinal axis of said valve housing and controlling a media connection between said pressure supply inlet and said load outlet, said valve control piston being hollow with an internal cavity opening coaxially to said load outlet;
    an equalizing mechanism providing pressure equalization to said valve control piston at media pressures at said pressure supply inlet, said equalizing mechanism including a damping bore in a direction of an actuation side of said valve control piston connecting said internal cavity of said valve control piston in permanent fluid communication to an equalization chamber of said valve housing that receives said valve control piston when retracted in said valve housing, said equalizing mechanism including a first seal and a second seal with said valve control piston having equal outer diameters on a media control side thereof and on said actuation side thereof at contact points of said valve control piston with said first and second seals;
    an annular soft seal forming said first seal, being adjacent said load outlet and being facially abutted by said valve control piston in a closed position of said valve control piston, said annular soft seal being held by a retaining ring with an L-shaped cross section, said retaining ring being held in said valve housing by a locking ring engaging said valve housing and said retaining ring;
    an O-ring seal being received in a groove in said valve housing and engaging first seal and said valve housing further sealing said first seal; and
    an O-ring forming said second seal, completely surrounding said valve control piston on a back actuation side of said valve control piston and being arranged in a recess of a control chamber housing, said control chamber housing being pot-shaped in a cross section and being held in position by a retaining part with an L-shaped cross section, said control chamber housing defining said equalization chamber and receiving said valve control piston.

2. A valve device according to claim 1 wherein
    said valve control piston has a uniform outer diameter between and including said contact points with said first and second seals in a closed position of said valve control piston.

3. A valve device according to claim 1 wherein
    a pneumatic actuator mechanism is connected to said valve control piston on said actuation side thereof and controls movement of said valve control piston in said valve housing.

4. A valve device according to claim 1 wherein
    said valve housing has a cartridge configuration detachably inserted in a valve block with said pressure supply inlet and said load outlet interconnected in fluid communication with media connection points of said valve block.

5. A valve device according to claim 4 wherein
    said valve housing comprises multiple separately formed parts joined by a first fastener that differs from a second fastener connecting said valve housing to said valve block.

6. A valve device according to claim 1 wherein
    said contact point between said valve control piston and a surface of said first seal is a line shape.

7. A valve device according to claim 1 wherein
    said retaining part has a third seal in an inner circumferential groove of said retaining part, said retaining part and said third seal supporting said valve control piston stress free.

8. A valve control device according to claim 1 wherein
    said valve control piston comprises a piston wall with a sealing edge on a free end of said piston wall remote from a cavity side of said piston wall, said sealing edge having a triangular cross section enlarging an inner diameter of said valve control piston in a zone of said free end while an outer diameter of said valve control piston remains unchanged such that said free end of said valve control piston linearly abuts said first seal in a closed position of said valve control piston with sealing achieved at an outer perimeter of said valve control piston.

9. A valve device for controlling media flows, the valve device comprising:
    a valve housing having a pressure supply inlet and a load outlet;
    a valve control piston guided in and longitudinally movable in said valve housing along a longitudinal axis of said valve housing and controlling a media connection between said pressure supply inlet and said load outlet, said valve control piston being hollow with an internal cavity opening coaxially to said load outlet;
    an equalizing mechanism providing pressure equalization to said valve control piston at media pressures at said pressure supply inlet, said equalizing mechanism including a damping bore in a direction of an actuation side of said valve control piston connecting said internal cavity of said valve control piston in permanent fluid communication to an equalization chamber of said valve housing that receives said valve control piston when retracted in said valve housing, said equalizing mechanism including a first seal and a second seal with said valve control piston having equal outer diameters on a media control side thereof and on said actuation side thereof at contact points of said valve control piston with said first and second seals; and
    a leakage line extending in said valve housing extends through a bottom housing part and a middle part of said valve housing, and bordering on a valve stem of said valve control piston, said leakage line being between two spaced O-ring seals, said O-ring seals being in and held by recesses of a top housing part of said valve housing and a control chamber housing defining said equalization chamber and receiving said valve control piston;
    whereby leakage passing said O-ring seals can drain out of said valve housing via said leakage line.

10. A valve device according to claim 9 wherein
    a pneumatic actuator mechanism is connected to said valve control piston on said actuation side thereof and controls movement of said valve control piston in said valve housing.

11. A valve device according to claim 9 wherein
said valve housing has a cartridge configuration detachably inserted in a valve block with said pressure supply inlet and said load outlet interconnected in fluid communication with media connection points of said valve block.

12. A valve device according to claim 11 wherein
said valve housing comprises multiple separately formed parts joined by a first fastener that differs from a second fastener connecting said valve housing to said valve block.

13. A valve device according to claim 9 wherein
said valve control piston comprises an internal cavity and a floor extending transversely across said internal cavity, said damping bore extending axially through said floor and having a transverse diameter less that a transverse diameter of said internal cavity.

14. A valve device according to claim 9 wherein
said valve control piston is only chamfered on an inner surface thereof and is not chamfered on an outer surface thereof adjacent said first seal.

15. A valve device according to claim 9 wherein
only a non-chamfered axial end of said valve control piston engages a surface of said first seal.

16. A valve device according to claim 9 wherein
said damping bore comprises first and second passage points effecting a pressure equalization and damping movement of said valve control piston with respect to fluid pressure at said pressure supply inlet in a movement direction of said valve control piston toward a closed position thereof;

wherein diameters of said first and second passage points produce greater throttling of media flow through said first and second passage points.

\* \* \* \* \*